United States Patent [19]

Dean, Jr. et al.

[11] Patent Number: 5,689,598
[45] Date of Patent: Nov. 18, 1997

[54] CONNECTOR BLOCK AND METHOD FOR SIMULTANEOUSLY MATING A PLURALITY OF OPTICAL FIBER CONNECTOR PAIRS

[75] Inventors: David L. Dean, Jr., Hickory; James R. Merriken, Hudson, both of N.C.

[73] Assignee: Siecor Corporation, Hickory, N.C.

[21] Appl. No.: 661,534

[22] Filed: Jun. 11, 1996

[51] Int. Cl.⁶ ......................................... G02B 6/38
[52] U.S. Cl. .................... 385/59; 385/53; 385/71
[58] Field of Search ................... 385/53, 56, 59, 385/54, 55, 60, 71

[56] References Cited

U.S. PATENT DOCUMENTS 5,214,730  5/1993  Nagasawa et al. ................. 385/59
5,555,332  9/1996  Dean et al. ........................ 385/53

Primary Examiner—Phan T. H. Palmer
Attorney, Agent, or Firm—Wesley T. Noah

[57] ABSTRACT

A connector block and method are provided wherein a plurality of optical fiber connectors can be removably loaded in the block for the simultaneous mating of such optical fiber connectors. Springs are disposed behind the connectors and the block defines a shoulder surface against which the spring is abutted. The block further defines connector channels to fix the connectors relative to each other in a lateral direction yet allow the connectors to slide backward in the longitudinal direction to compress the spring. Two such blocks can be connected to each other for simultaneously mating and spring loading the plurality of connectors.

16 Claims, 9 Drawing Sheets

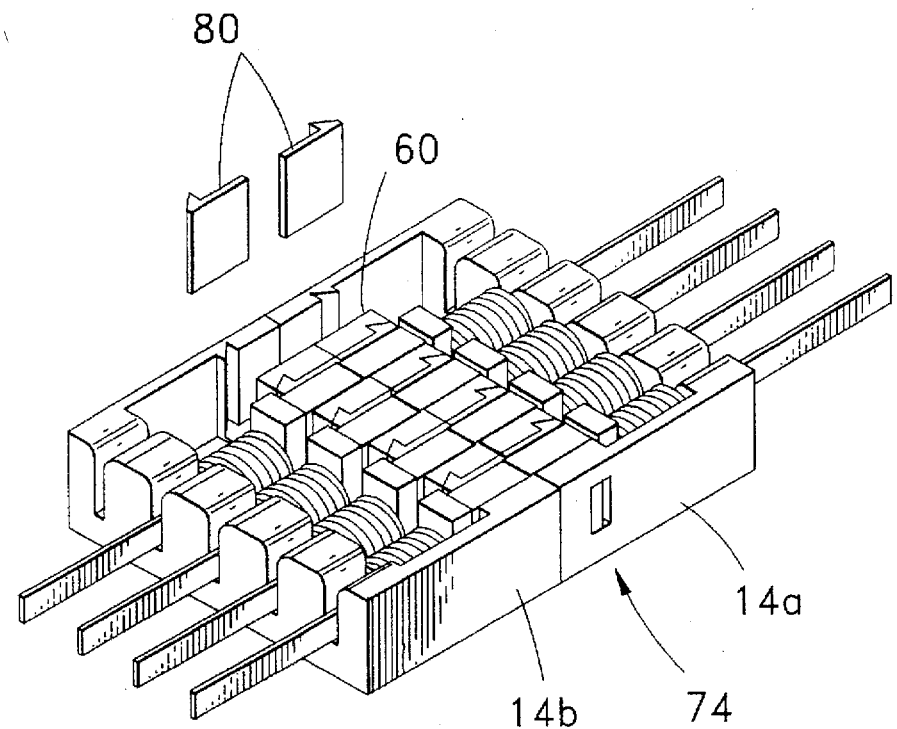
FIG. 7
FIG. 8
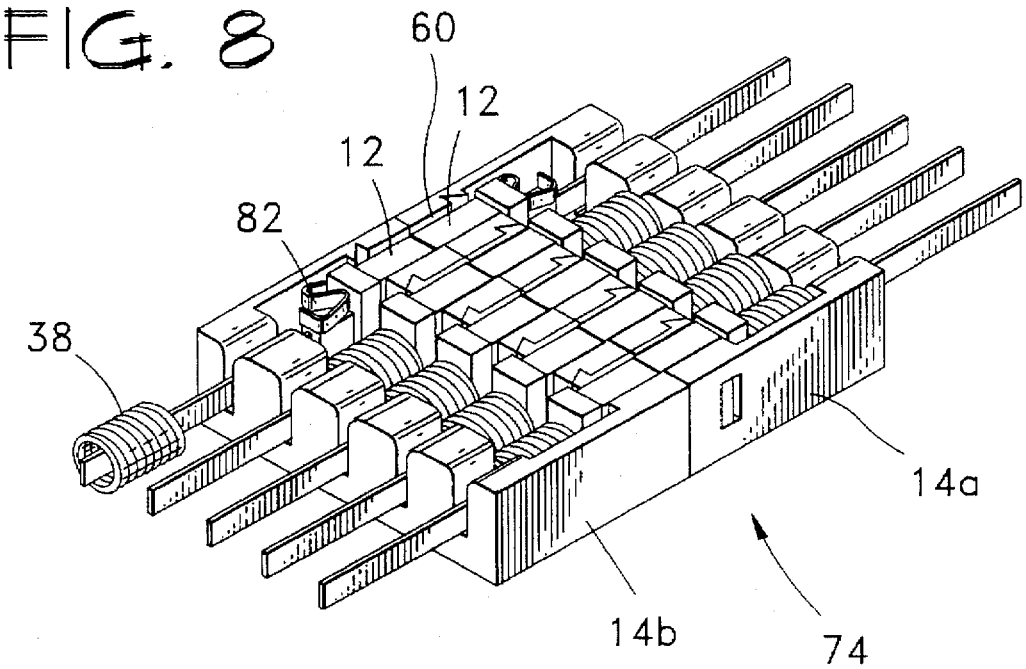

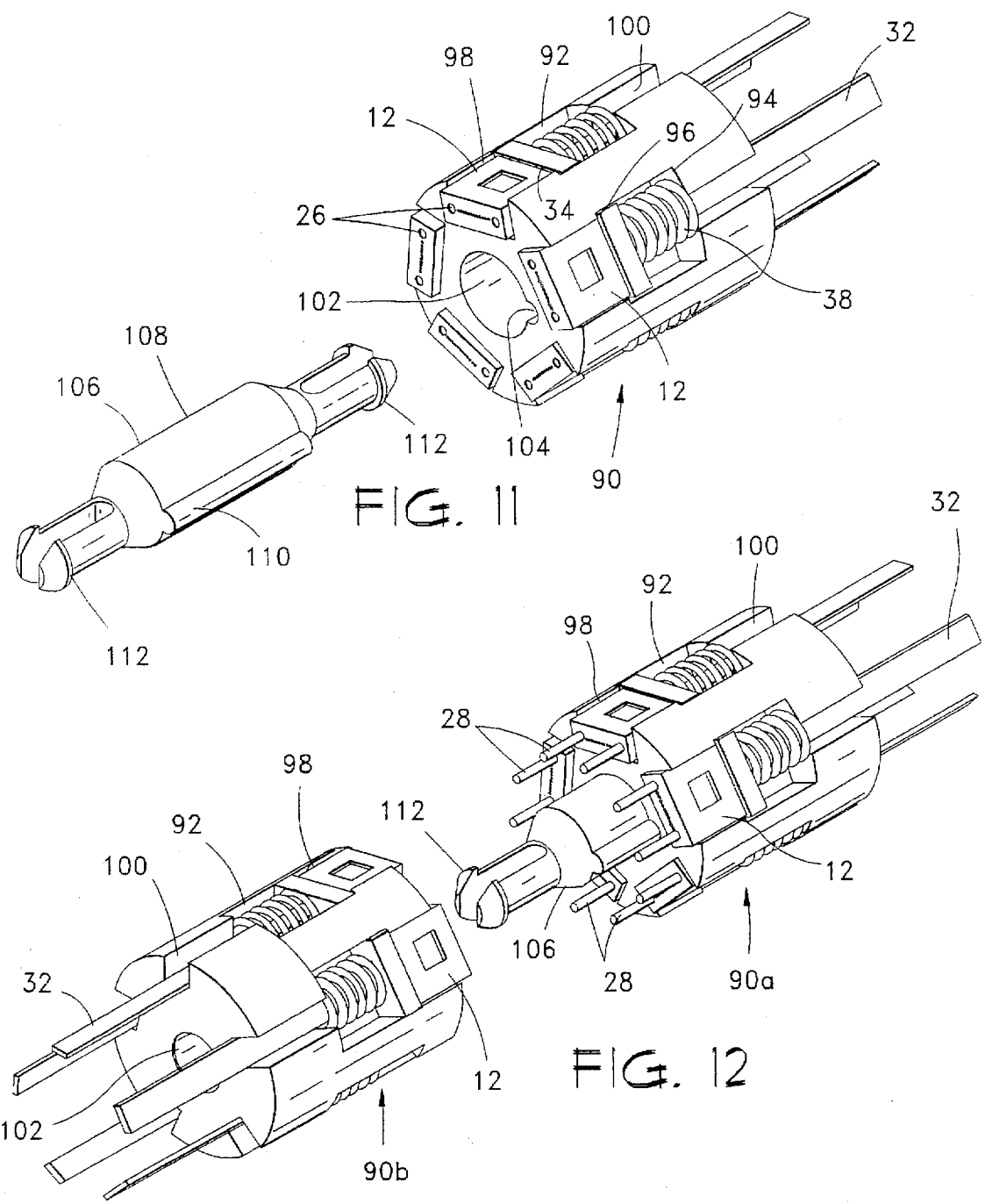

CONNECTOR BLOCK AND METHOD FOR SIMULTANEOUSLY MATING A PLURALITY OF OPTICAL FIBER CONNECTOR PAIRS

TECHNICAL FIELD OF THE INVENTION

The present invention relates to a connector block in which a plurality of optical fiber connectors can be removably loaded for the simultaneous mating of such optical fiber connectors.

BACKGROUND OF THE INVENTION

Connecting together two large optical fiber cables requires the time consuming task of mating each fiber from one cable to a corresponding fiber of the other cable. When the large cable contains several ribbon cables, a multi-fiber optical connector is often used to mate two ribbon fibers together. In commonly assigned co-pending application Ser. No. 08/487,765 filed Jun. 8, 1995 and entitled "Applicator and Associated Method for Inserting Guide Pins in a Fiber Optic Connector" now U.S. Pat. No. 5,555,332, a shell 14 is disclosed for receiving a stack of multi-fiber optical connectors which allows for the application of pins and gel to a plurality of connectors simultaneously as well as the subsequent mating of a corresponding stack of connectors simultaneously. The simultaneous pinning, gelling and mating eases the task of connecting two large optical fiber cables. The subject matter of such application is incorporated herein by reference.

After the stacks of connectors are mated in Ser. No. 08/487,765 now U.S. Pat. No. 5,555,332, individual pairs of mated connectors are removed and clipped with a spring one pair at a time. The connector pairs must be spring clipped to maintain the end faces of the connectors forced against each other. Without such spring loading of the end faces, an acceptable connection between connectors could not be maintained. The spring clipped connector pairs are then loaded into a subunit that can hold a group of connector pairs. The subunit is then loaded into one of several connector trays housed in a cylindrical connector closure that resembles what are commonly known as splice closures except that it is actually enclosing mated multi-fiber connector pairs instead of splices. U.S. Pat. No. 5,214,730 to Nagasawa et al. further discloses multi-fiber ferrule optical connectors of the type that may be used with the present invention. See, e.g., FIGS. 1–4 of Nagasawa. Although it should be understood that the present invention is not limited to use with such multi-fiber ferrules.

One disadvantage of the shell and method of Ser. No. 08/487,765 now U.S. Pat. No. 5,555,332 is that after the two stacks of connectors are mated, each pair must be removed and spring clipped one pair at a time. This is a time consuming process. Additionally, there is a risk of a pair becoming unmated during the removal of the connector pairs from the shell. Therefore a need exists for a device that not only allows simultaneous mating of stacks of connectors, but also does not require removal of the pairs of connectors for individual spring loading.

Another disadvantage of Ser. No. 08/487,765 now U.S. Pat. No. 5,555,332 is that after two shells have been loaded with connectors and mated to each other, the connector pairs are then removed and placed in a separate subunit for placement in a tray or other storage device. This transfer of mated pairs to another device is time consuming. Therefore, a need exists for a device that allows for simultaneous mating of connector pairs and then doubles as a subunit that can be placed directly in a connector tray of a connector closure thereby eliminating the need to transfer mated connector pairs from a shell to a subunit.

After two large cables are connected, it is almost inevitable that some connections will want to be changed to effect changes in the optical fiber network. Accordingly, a need exists for such a device to allow, after the connectors have been mated and spring loaded in a subunit, for individual access to any one connector pair without having to disturb the other connector pairs in a subunit. For example, if the network is being rearranged or supplemented after the initial installation, individual connections can be accessed to change or reroute a line of the network.

SUMMARY OF THE INVENTION

To meet the foregoing needs, a connector block and method are provided. The connector block assembly of the present invention comprises a plurality of connector and spring combinations that are removably loaded in a connector block. Each connector has a first end with an end face for mating against an end face of another connector and a second end where an optical fiber enters the connector. Each connector has a longitudinal direction extending from the first end to the second end.

Each spring has a first end disposed against the second end of a respective one of the plurality of connectors, and a second end opposite thereto. The springs have a direction of compression parallel with the longitudinal direction of the connectors.

The plurality of connectors and springs are removably mounted in the block in parallel relation to each other with each end face of the plurality of connectors exposed. The block defines a first shoulder surface against which each second end of the plurality of springs is abutted. The block is configured to retain the plurality of connectors fixed relative to each other in a lateral direction while allowing linear movement of the plurality of connectors in the longitudinal direction against the plurality of springs and while allowing ready removal of individual connectors from the block while other connectors remain undisturbed.

Another aspect of the invention is solely the connector block as discussed above.

The method of the present invention provides a method of simultaneously mating and spring loading a plurality of connectors. A spring is disposed behind each connector of the first and second plurality of connectors. The springs have a first end to be abutted against the connector and a second end opposite thereto. The plurality of pairs of springs and connectors are placed together in a respective block by abutting the second end of the spring against a first shoulder surface defined in the respective block. The first and second blocks are configured to allow longitudinal movement of their respective plurality of connectors to compress the springs against the first shoulder surface. The first block is then mated to the second block to create a subunit and thereby operatively mate and spring load the first plurality of connectors to the second plurality of connectors.

Another aspect of the method of the present invention provides a method of simultaneously mating a first plurality of connectors to a second plurality of connectors and allowing access to individual mated connector pairs. Each plurality of connectors is removably placed in a respective block. The first block is mated to the second block to create a subunit and thereby operatively mate the first plurality of connectors to the second plurality of connectors. One mated connector pair is removed from the subunit without disturbing the other mated connector pairs. A new connector pair is removably placed in the block in the place of the connector pair that was removed.

The present invention allows for a streamlined procedure of initially connecting two optical fiber cables together and for later modifications to the initial connection. Individual spring loading of connector pairs is eliminated, transferring of connector pairs from one subunit to another subunit is eliminated, and accessibility to individual connector pairs is afforded without the need to disturb other connector pairs.

BRIEF DESCRIPTION OF THE DRAWINGS

FIG. 7 is a perspective view of the subunit of FIG. 5 with two inserts removed to allow placement of a spring clipped connector pair in the subunit;

FIG. 8 is a perspective view of the subunit as shown in FIG. 7 with a spring clipped connector pair placed therein;

FIG. 11 is a perspective view of the connector block of FIG. 10 fully loaded with connectors and an alignment latch pin disposed for insertion into the connector block;

FIG. 12 is a perspective view of the connector block of FIG. 10 with the alignment latching pin inserted therein and a second connector block disposed for mating with the first connector block;

DETAILED DESCRIPTION

Figure 1:
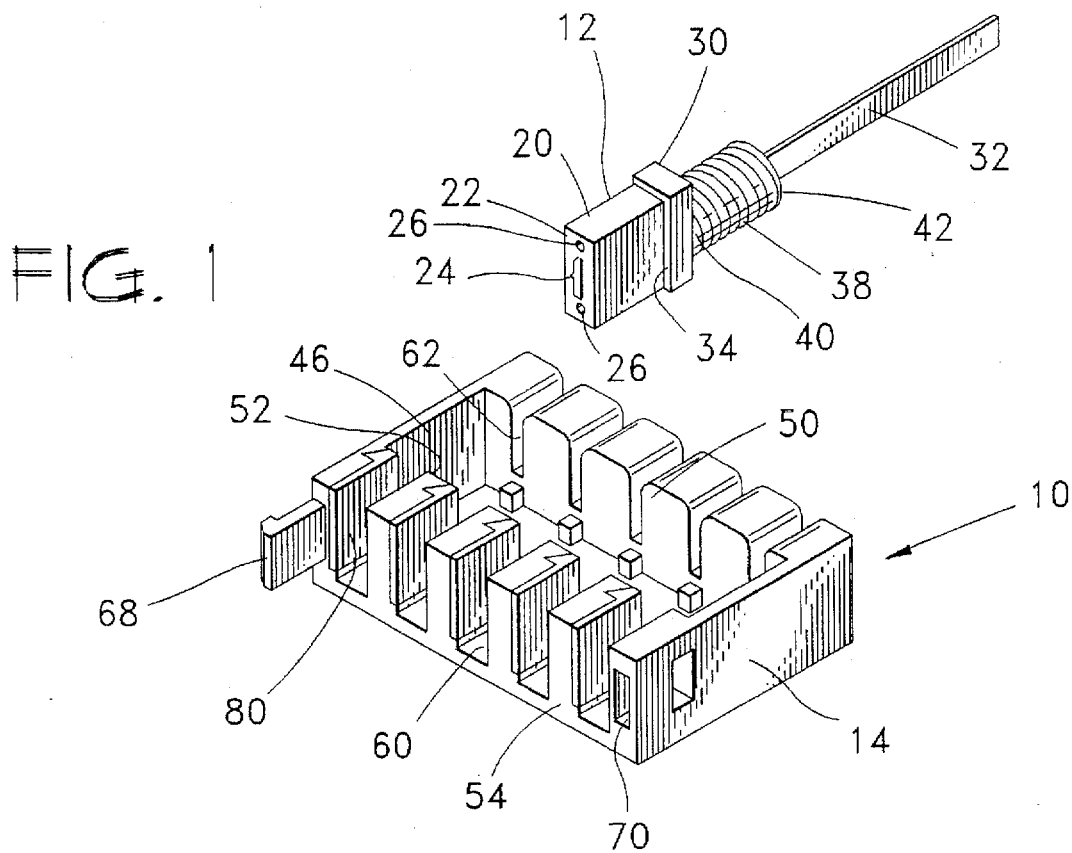
FIG. 1 is a perspective view of the preferred embodiment of the connector block of the present invention with a connector disposed for placement therein.

With reference to FIGS. 1–9, the preferred embodiment of the present invention is shown. One aspect of the present invention is connector block 10 shown in FIG. 1 in which a plurality of optical fiber connectors 12 can be removably loaded. Another aspect of the present invention is connector block assembly 11 shown in FIG. 2 which is the combination of connector block 14 with connectors 12 and springs 38 removably loaded therein. Connectors 12 are shown as the MT type of connector discussed in the background of the invention. While the preferred embodiment is shown in the context of such MT connectors comprising a multi-fiber ferrule, its should be understood that the present invention may be used with other types of optical fiber connectors or ferrules.

Connector 12 has first end 20 with end face 22 at which optical fibers 24 terminate and into which guide pin holes 26 are formed. End face 22 is intended to but against another end face 22 of another connector 12 as guide pins 28 (see FIG. 4) disposed in the guide pin holes 26 of one connector insert into the guide pin holes of the other connector to insure proper alignment of the two opposing sets of optical fibers 24. End faces 22 may be of any configuration, for example, angled and/or stepped faces. Several examples of end faces are disclosed in the above referenced Nagasawa patent.

Connectors 12 have second end 30 opposite first end 20 into which ribbon fiber 32 enters connector 12. Ribbon fiber 32 contains optical fibers 24 sheathed together in a row. Connectors 12 have a stepped cross-section that defines shoulder 34 between first end 20 and second 30 of connector 12. Shoulder 34 faces toward first end 20. Shoulder 34 may extend entirely around connector 12 or it may be only at one or more discrete places on connector 12.

Disposed behind connector 12 is spring 38. While a coil spring that encircles fiber 32 is shown, it should be understood that any of a variety of springing designs may be used as a substitute therefore. For example, some type of spring leaf arrangement could be used that would not require total encircling of fiber 32. Spring 38 has first end 40 for abutting against second end 30 of connector 12, and second end 42 opposite thereto. The longitudinal direction is defined as extending parallel with fiber 32, spring 38 and from second end 30 to first end 20 of connector 12.

Block 14 may be any of a variety of configurations. In the preferred embodiment, block 14 defines open cavity 46 which is sized to receive a plurality of connectors 12 with springs 38 therein while allowing for passage of ribbon fibers 32 into cavity 46, protrusion of end faces 22 outside of block 14, and longitudinal movement of connectors 12 relative to block 14 upon mating of two blocks 14 to each other. To achieve these features in the preferred embodiment, block 14 has first shoulder surfaces 50 against which second ends 42 of springs 38 abut. Block 14 also has second shoulder surfaces 52 against which shoulders 34 of connectors 12 abut. Opposing shoulder surfaces 50 and 52 of block 14 are spaced (or it could be said that spring 38 is sized) so that when shoulder 34 of connector 12 is abutted against second shoulder surface 52 and second end 42 of spring 38 is abutted against first shoulder surface 50, spring 38 is under compression.

Block 14 has front face 54 which is spaced from second shoulder surfaces 52 a distance shorter than the distance of shoulder 34 of connector 12 to end face 22 of connector 12. In this arrangement, end face 22 of connector 12 will protrude beyond front face 54 of block 14 when shoulder 34 of connector 12 is abutted against second shoulder surface 52 of block 14. It can be seen that spring 38 bears shoulder 34 of connector 12 against second shoulder surface 52 of block 14.

Figure 6:
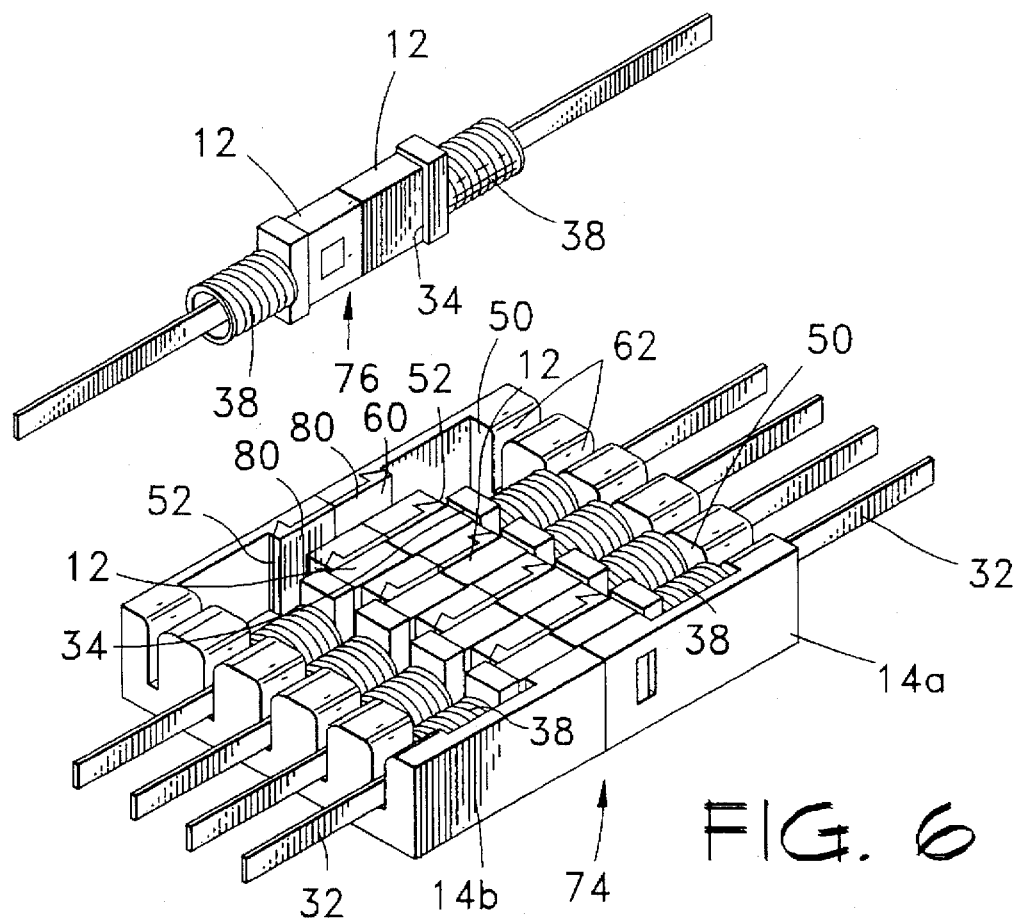
FIG. 6 is a perspective view of the subunit of FIG. 5 with lids removed an a connector pair removed from the subunit for changing the connection.
Figure 9:
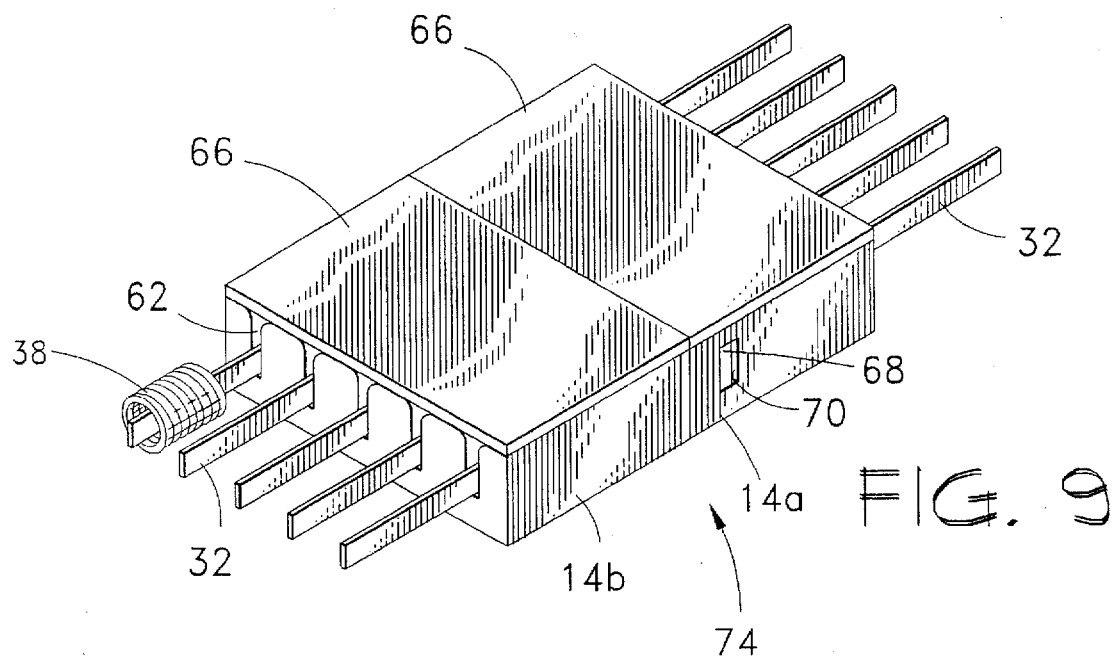
FIG. 9 is a perspective view of the subunit as shown in FIG. 8 with the lids closed over the subunit and the unneeded spring disposed outside of the subunit.
Figure 10:
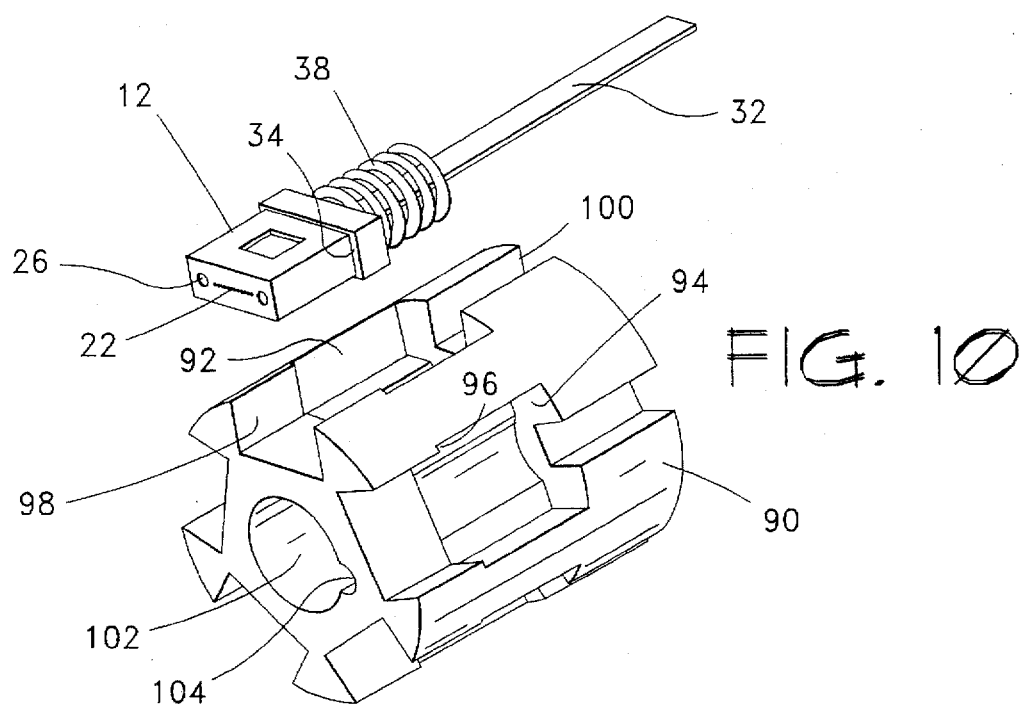
FIG. 10 is a perspective view of an alternative embodiment of the block of the present invention with a connector disposed for placement therein.

As can be seen in FIG. 6, when two blocks 14 are connected, opposing end faces 22 of connectors 12 are forced against each other to cause connectors 12 to slide back into block 14 against the force of spring 38. As such, shoulders 34 are moved off of second shoulder surfaces 52 and the biasing force of springs 38 is transferred to force opposing end faces 22 of connectors 12 against each other.

To assist in the precision of mating two pluralities of connectors 12 together, block 14 defines connector channels 60 for slidable receiving the portion of connectors 12 between shoulder 34 and first end 20. Connector channels 60 are constructed to minimize the lateral play of connectors 12 in block 14 to fix connectors 12 relative to each other in the lateral direction to allow precise mating of two fully loaded blocks 14. At the same time, connector channels 60 allow connectors 12 to slide back against springs 38 upon mating to other connectors.

A further preferred enhancement of block 14 includes fiber channels 62 which allow for placement of ribbon fibers 32. Fiber channels 62 may be omitted, but they are of sufficiently small cross-section so as to allow for a more block like configuration of block 14 for rigidity and prevention of undesired dust and contaminates into cavity 46. Some type of strain relief and/or sealing could be incorporated into channels 62 to prevent accidental pulling of fiber 32 from damaging the fiber/connector construction and/or better prevent ingress of contaminates into cavity 46.

Figure 2:
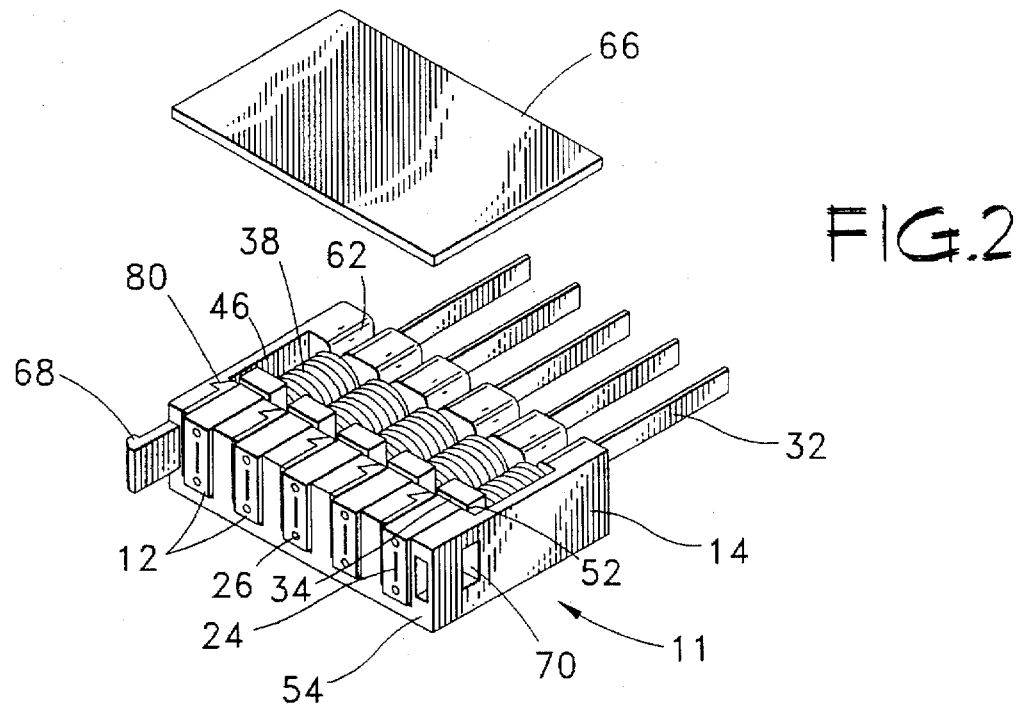
FIG. 2 is a perspective view of the connector block of FIG. 1 fully loaded with connectors and a lid disposed for closure over the connector block.
Figure 3:
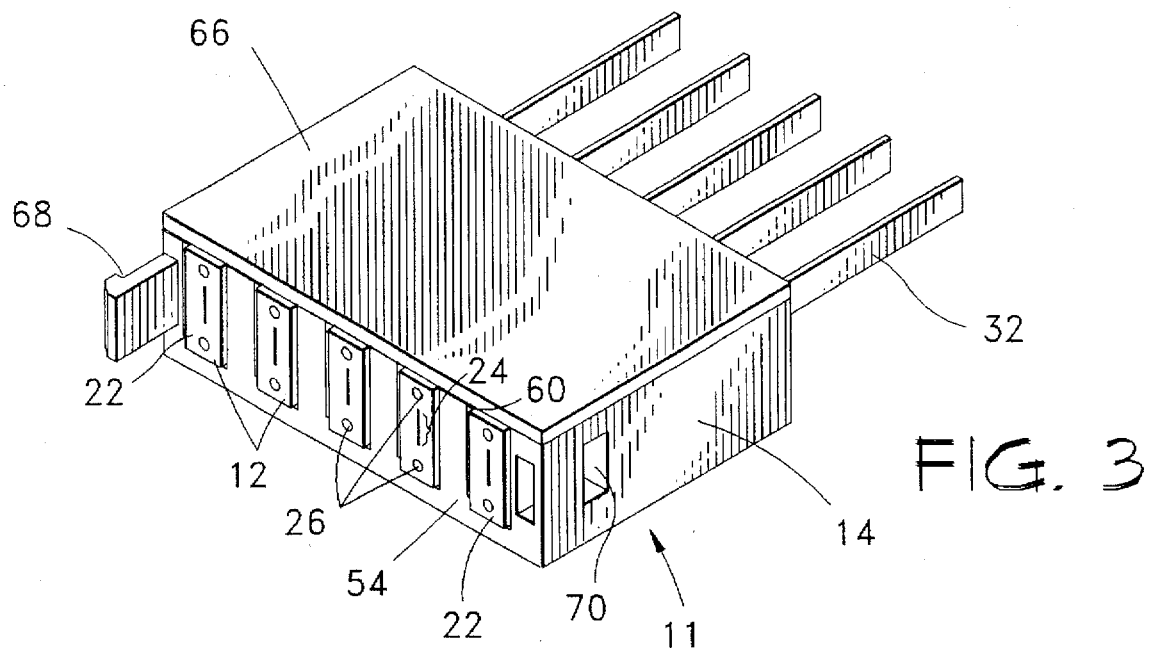
FIG. 3 is a perspective view of the connector block of FIG. 1 with a lid closed thereover.
Figure 4:
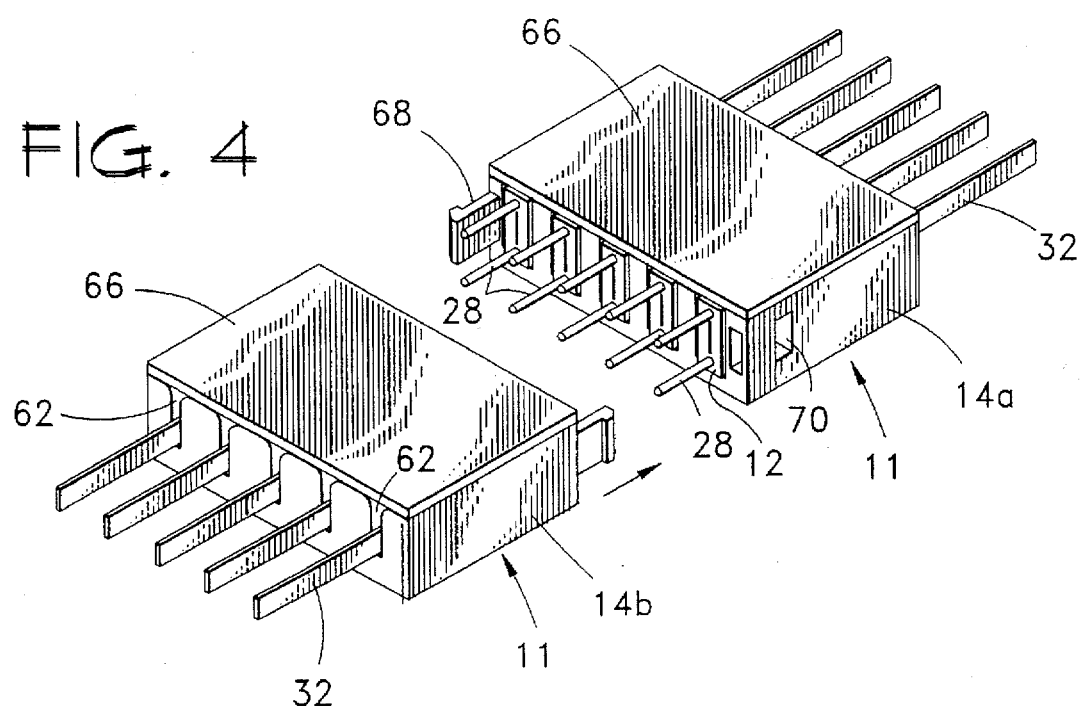
FIG. 4 is a perspective view of the connector block of FIG. 3 with guide pins inserted in the connectors and a second connector block disposed for mating therewith.

In operation, the connector 12 and spring 38 combinations are loaded into block 14 as shown in FIG. 2. A lid 66 may be placed over cavity 46 as shown in FIG. 3. FIG. 4 shows first block 14a and second block 14b disposed for mating. Latches 68 and corresponding receptacles 70 are provided for mating of blocks 14a and 14b together. Any type of latching or attaching arrangement may be used. Before blocks 14a and 14b can be mated in the MT connector context, guide pins 28 first must be inserted into connectors 12 of one the blocks, e.g. block 14a in FIG. 4. Guide pins may be inserted individually, or a pin applicator as disclosed in commonly assigned co-pending Ser. No. 08/487,765 now U.S. Pat. No. 5,555,332 may be used. Index matching gel also may be applied if desired to one or both sets of end faces 22 of one of the blocks 14 as also disclosed in co-pending Ser. No. 08/487,765 now U.S. Pat. No. 5,555,332.

Figure 5:
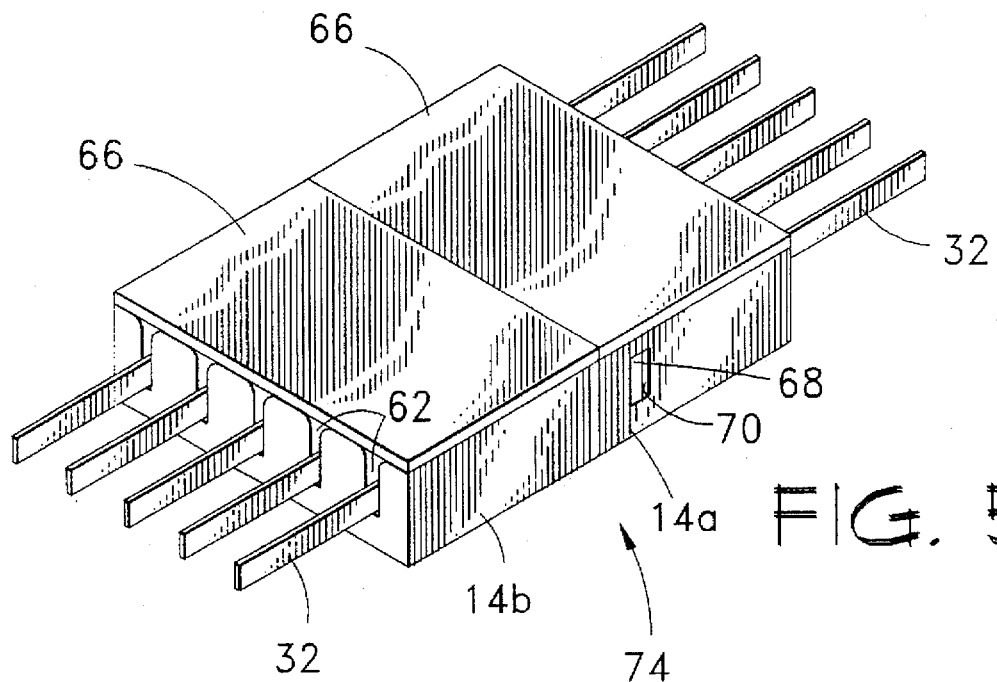
FIG. 5 is a perspective view of the connector blocks of FIG. 4 mated together to form a subunit.

After pins and any desired gel have been applied (if connectors other than the conventional MT type are used, guide pins may not be necessary) blocks 14a and 14b are mated until latches 68 catch in receptacles 70 as shown in FIG. 5 to create subunit 74. In an initial installation, subunit 74 may then be placed in a tray or drawer in a connector closure. Subunit 74 is readily handled and easily stored in high density arrangements.

With reference to FIGS. 6–9, a further aspect of the present invention involves the ability to access the interior of subunit 74 to break a single connection without disturbing the other connections in the subunit. When a change is desired in a connection, the subunit containing the line desired to be changed is removed from the tray or drawer in the closure, and lids 66 are removed from blocks 14 to open cavities 46. The pair 76 of mated connectors to be broken is removed from blocks 14a and 14b and disconnected. Any new connection is then made and, if each connector of the new connection has a spring 38, inserted into subunit 74.

Figure 17:
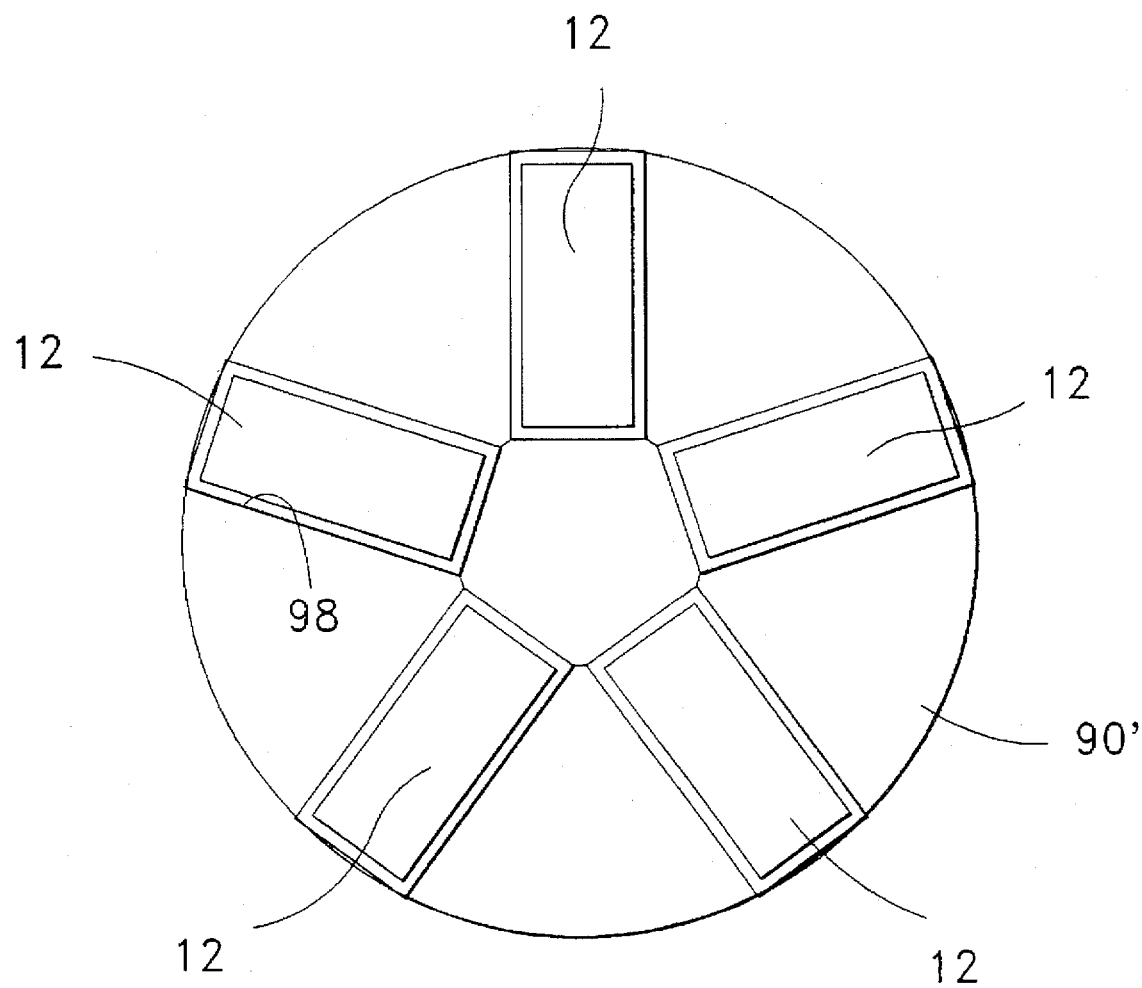
FIG. 17 is an end view of another alternative embodiment of the connector block of the present invention fully loaded with connectors.

A further aspect of the present invention involves the ability to accommodate a new connection where one or both of the connectors of the new connection will not have a spring 38 preinstalled on ribbon fiber 32. If a springing mechanism that is not required to be preinstalled on ribbon fiber 32 but could be placed behind a connector 12 without the need to encircle fiber 32, then this further aspect of the present invention could be obviated. However, another advantage of this aspect is the ability to also accommodate a different type of joint that may have a larger size than an MT connector joint. More specifically, this further aspect comprises inserts 80, two of which are shown removed from blocks 14a, b in FIG. 7. If one of the connectors 12 does not have a corresponding spring 38, then the two connectors may be biased against each other by use of a conventional spring clip 82 as shown in FIG. 8. See also FIG. 17 showing spring clip 82 in use in an alternative embodiment. Then the inserts 80 that are located where the connectors are to be disposed in blocks 14 are removed thereby creating additional room to allow for the placement of connectors 12 with spring clip 82 as shown in FIG. 8. If one of the connectors that was spring clipped also had a spring 38, spring 38 can simply be slid down ribbon fiber 32 so that spring 38 is disposed outside of subunit 74 as shown in FIG. 8 and also in FIG. 9 where lids 66 have been reinstalled.

By using inserts 80, connector channels 60 can have a tight fit with connectors 12 for the initial installation by virtue of inserts 80 defining part of the channel. Then when inserts 80 are removed, connector channels 60 are enlarged to allow room for a spring clip or other type of joint.

Figure 15:
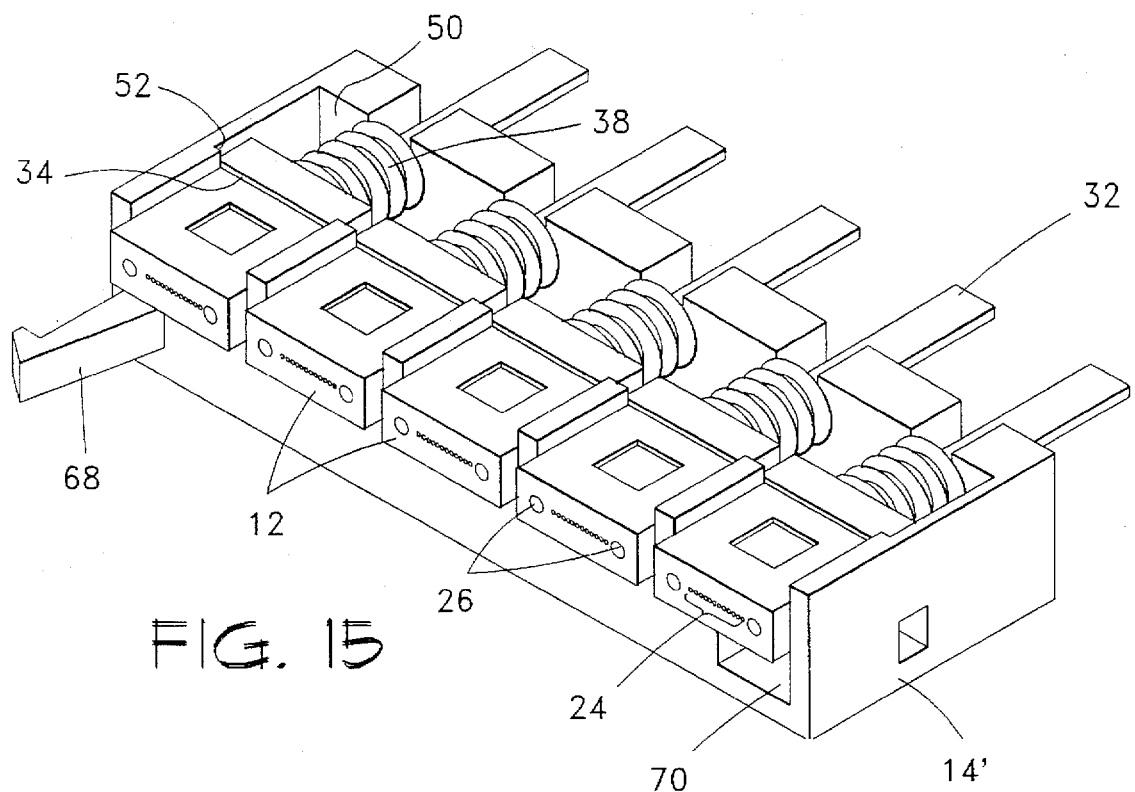
FIG. 15 is a perspective view of another alternative embodiment of the connector block of the present invention fully loaded with connectors.

It should be noted that connectors 12 are oriented such that the row of connectors has the smallest dimension. In other words, each of the connectors 12 in block 14 could be rotated 90 degrees as shown in FIG. 15. The block of FIG. 15 is wider; however, one advantage of the embodiment of FIG. 15 is that the inserts 80 may be eliminated because any spring clip that may be used in the future will extend upward from the connectors and not to the side as in FIG. 8. The connector channels in FIG. 15 still locate connectors 12 with or without spring clips 82.

FIGS. 10–14 show an alternative embodiment where block 90 is formed in a cylindrical arrangement. A similar advantage as just discussed with respect to FIG. 15 is achieved by virtue of connectors 12 arranged around the cylinder with their widest dimension of the connector perpendicular to the radial direction. However, connectors 12 could also be arranged with their widest dimension aligned with the radial direction as shown in FIG. 17.

Block 90 of FIGS. 10–14 defines circumferentially spaced cavities 92. Each cavity 92 has first shoulder 94 and second shoulder 96 for capturing therebetween shoulder 34 of connector 12 and spring 38. Block 90 defines connector channels 98 and fiber channels 100 similar to the preferred embodiment. Block 90 also defines alignment bore 102 and groove 104. FIG. 11 shows block 90 fully loaded with connectors 12.

Figure 13:
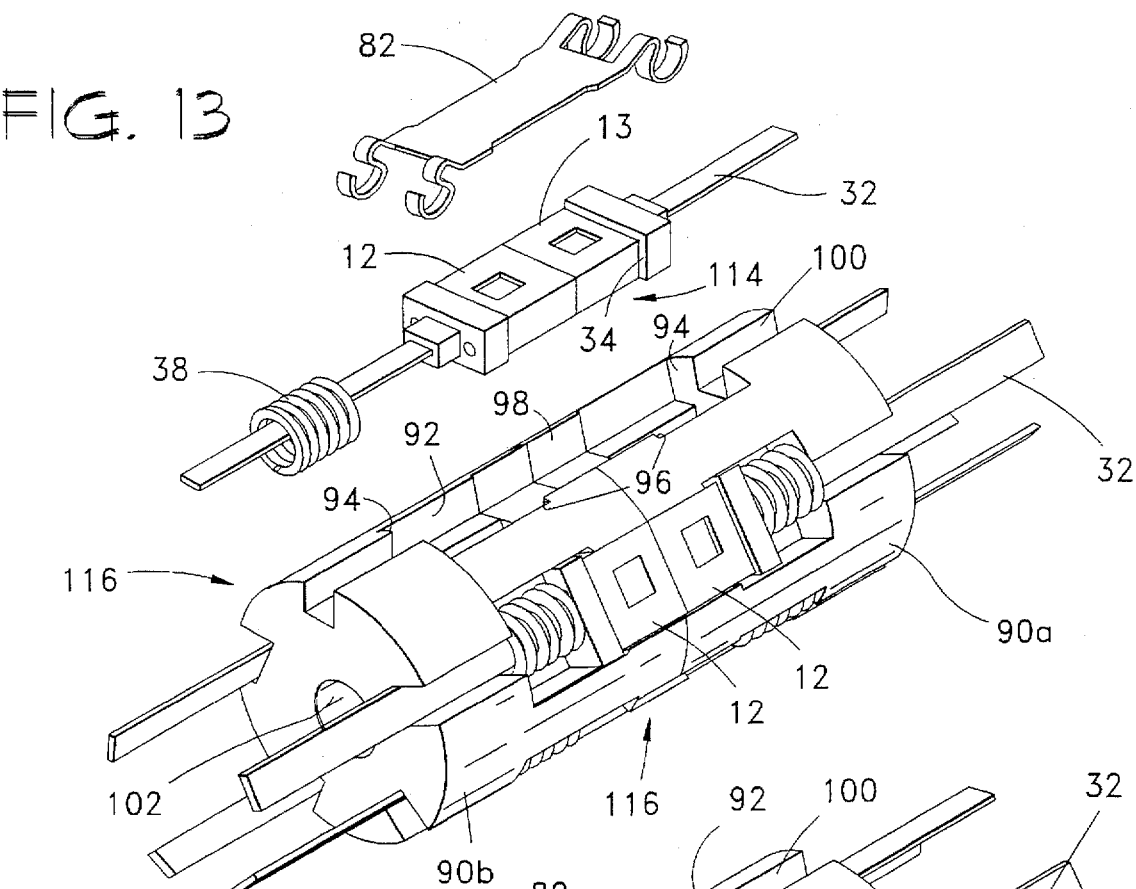
FIG. 13 is a perspective view of the two connector blocks mated to form a subunit and after a connector pair has been removed from the subunit, one of the two original connectors removed, a new connector mated to the remaining original connector, and a spring clip disposed for being attached to the new connector pair.

With reference to FIGS. 11 and 12, alignment latch pin 106 has center portion 108 with an outer diameter and rib 110 sized to insert into alignment bore 102 and groove 104 to align two blocks 90 as shown in FIGS. 12 and 13. Alignment latch pin 106 also has opposed latching ends 112 for latching of blocks 90 to alignment latch pin 106.

In operation of the embodiment of FIGS. 10–14, a first plurality of connectors 12 and their corresponding springs 38 are loaded into block 90a and a second plurality of connectors 12 and their corresponding springs 38 are loaded into block 90b. Then blocks 90a, b are pushed together over alignment latching pin 106 until latching ends 112 latch. This mating will push end faces 22 of connectors 12 against each other and push connectors 12 back into their respective blocks against the spring force of springs 38. The same advantages are achieved as with the preferred embodiment, namely, the ability to simultaneously mate a group of connectors and simultaneously spring force the connectors against each other without the need to individually spring clip each connector pair, the ability to use the same subunit for simultaneous mating and for placement into a tray or drawer, and the ability to access individual mated pairs of connectors for changing a connection without disturbing other mated pairs of connectors.

Figure 14:
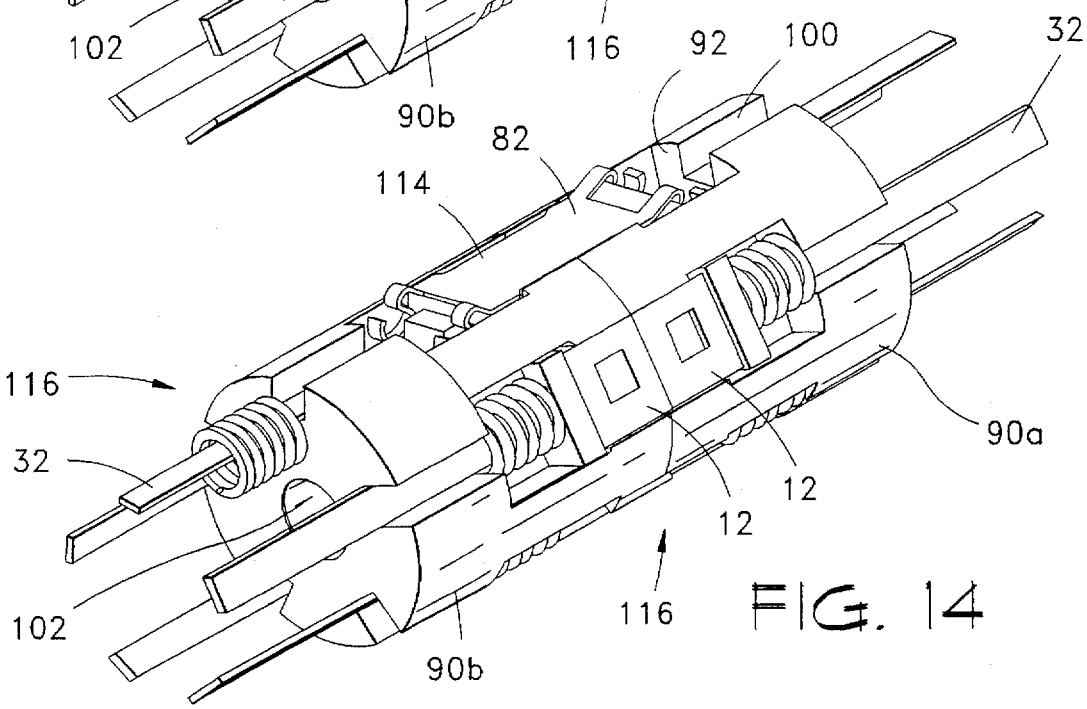
FIG. 14 is a perspective view of the subunit as shown in FIG. 13 with the new connector pair spring clipped and placed in the connector block.

FIG. 13 shows two blocks 90 joined to create subunit 116. FIG. 13 also shows new connector pair 114 with an original connector 12 and a new connector 13 having replaced the other original connector. Connector 13 does not have spring 38 thus spring clip 82 is used to bias the end faces of connectors 12 and 13 together. FIG. 14 shows the spring clipped pair 114 placed in cavity 92 of subunit 116.

Figure 16:
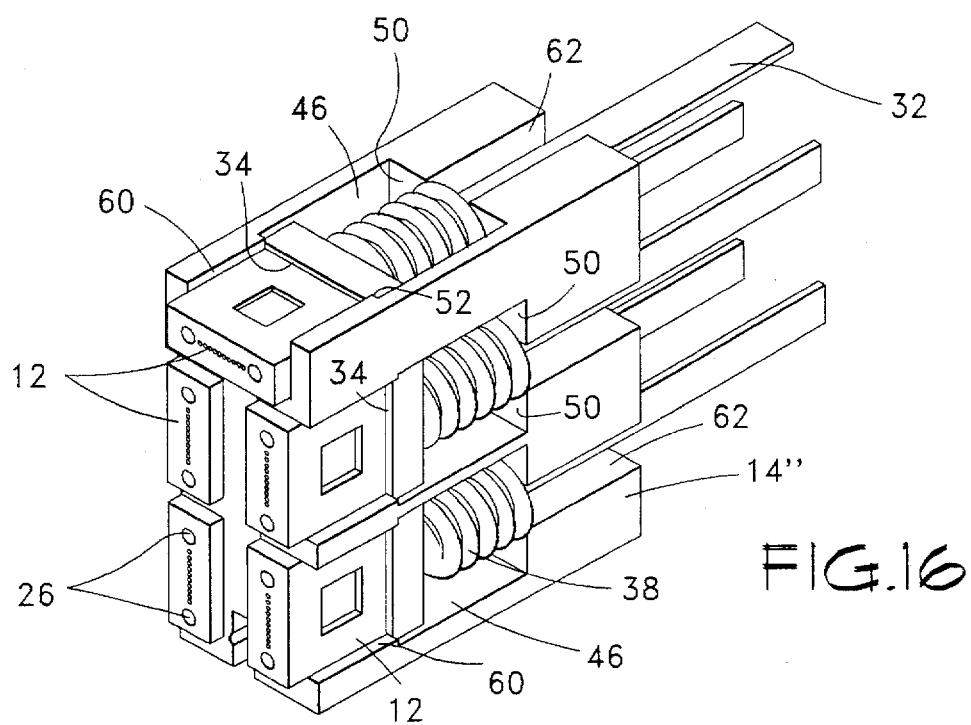
FIG. 16 is a perspective view of another alternative embodiment of the connector block of the present invention fully loaded with connectors.

FIG. 15–17 illustrate alternative block geometries. FIGS. 15 and 17 have been discussed above. FIG. 15 shows block 14' configured to hold connectors 12 side by side. FIG. 16 shows block 14" to provide a compact arrangement for five connectors. FIG. 17 shows block 90' configured to hold connectors 12 rotated 90 degrees from the orientation of connectors 12 in block 90 of FIGS. 10–14. It should be understood that while the embodiments discussed herein accommodate five connectors, the present invention can be applied to any number of connectors.

One aspect of the method of the present invention is the loading of connectors 12 in block 14 such that two like loaded blocks can be mated together thereby simultaneously mating and spring loading a plurality of connectors 12. Another aspect of the method of the present invention is the removable loading of connectors 12 in block 14 and the ability to later access an individual connector pair without disturbing the other connector pairs. These aspects have been further discussed above with respect to the operation of the various embodiments of the present invention.

Although the present invention has been described with respect to certain embodiments, it should be understood that various changes, substitutions and modifications may be suggested to one skilled in the art, and it is intended that the present invention encompass such changes, substitutions and modifications as fall within the scope of the appended claims.

We claim:

1. A connector block assembly, comprising:
   (a) a plurality of connectors, each connector having a first end with an end face for mating against an end face of another connector and a second end where an optical fiber enters the connector, each connector having a longitudinal direction extending from the first end to the second end;
   (b) a plurality of springs, each spring having a first end disposed against the second end of a respective one of the plurality of connectors, and a second end opposite thereto, the spring having a direction of compression parallel with the longitudinal direction of the connectors; and
   (c) a block in which the plurality of connectors are removably mounted in parallel relation to each other with each end face of the plurality of connectors exposed and facing in the same direction and such that any individual connector can be removed from the block without disturbing the other connectors, the block defining a first shoulder surface against which each second end of the plurality of springs is abutted, the block configured to retain the plurality of connectors fixed relative to each other in a lateral direction while allowing linear movement of the plurality of connectors in the longitudinal direction against the plurality of springs and while allowing ready mounting and dismounting of connectors from the block.

2. The connector block assembly of claim 1 wherein the connectors have a stepped cross-section defining a connector shoulder that faces toward the first end of the connector, and wherein the block further defines second shoulder surfaces facing toward the first shoulder surfaces, the connector shoulder being abutted against the second shoulder surface of the block and the second end of the spring being abutted against the first shoulder surface of the block.

3. The connector block assembly of claim 2 wherein the block defines a plurality of connector channels, each connector channel sized to receive a portion of one connector therein such that the plurality of connectors are fixed relative to each other in the lateral direction while allowed to move in the longitudinal direction to compress the springs.

4. The connector block assembly of claim 3 wherein the portion of the connector between the connector shoulder and the first end of the connector is slidably disposed in the longitudinal direction in a respective one of the plurality of connector channels.

5. The connector block assembly of claim 4 further comprising a plurality of inserts, each insert defining at least a portion of a respective one of the plurality of connector channels so that while the insert is in place, the channels are in close tolerance with the connectors, and when the inserts are removed, the connector channel is enlarged.

6. The connector block assembly of claim 1 wherein the block is cylindrical and the connectors are received in a plurality of cavities circumferentially spaced around the block.

7. A connector block configured for removably receiving a plurality of connectors each connector with a spring abutted behind it, the connector block comprising a block in which the plurality of connectors can be removably mounted in parallel relation to each other facing the same direction and such that any individual connector can be removed from the block without disturbing the other connectors, the block defining a first shoulder surface and a second shoulder surface spaced apart and facing each other to receive the spring and at least a portion of the connector therebetween such that the spring is under compression between the connector and the first shoulder surface, the block configured to retain the plurality of connectors fixed relative to each other in a lateral direction while allowing linear movement of the plurality of connectors in the longitudinal direction against the plurality of springs and while allowing ready mounting and dismounting of connectors from the block.

8. The block of claim 7 further defining connector channels for slidably receiving at least a portion of the connectors for sliding in the longitudinal direction while fixing the connectors relative to each other in the lateral direction.

9. The block of claim 8 wherein the block is cylindrical and defines a plurality of cavities circumferentially spaced around the block to receive the connectors.

10. The block of claim 8 further comprising at least one latch for attaching to another block to mate the plurality of connectors to those of the other block.

11. A method of simultaneously mating and spring loading a first plurality of connectors with a second plurality of connectors comprising the steps of:

(a) disposing a spring behind each connector of the first and second plurality of connectors, the spring having a first end to be abutted against the connector and a second end opposite thereto;

(b) removably placing the first plurality of connectors with springs together in a first block and placing the second plurality of connectors with springs together in a second block by abutting the second end of the springs against a first shoulder surface defined in the respective block such that any individual connector can be removed from its respective block without disturbing the other connectors in the block, first and second blocks configured to allow longitudinal movement of their respective plurality of connectors to compress the springs against the first shoulder surface; and (c) mating the first block to the second block to create a subunit and thereby operatively mating and spring loading the first plurality of connectors to the second plurality of connectors.

12. The method of claim 11 further comprising the step of removing one mated connector pair from the subunit without disturbing the other mated connector pairs.

13. The method of claim 12 further comprising the step of removing an insert set in the block to create additional space where the connector pair had been disposed.

14. A method of simultaneously mating a first plurality of connectors to a second plurality of connectors and allowing access to individual mated connector pairs comprising the steps of:

(a) removably placing the first and second plurality of connectors in a first and second block, respectively;

(b) mating the first block to the second block to create a subunit and thereby operatively mating the first plurality of connectors to the second plurality of connectors; and (c) removing any mated connector pair from the subunit without disturbing the other mated connector pairs; and (d) removably placing a connector pair in the subunit in the place of the connector pair that was removed.

15. The method of claim 14 further comprising the step of disposing a spring behind each connector of the first and second plurality of connectors, the spring having a first end to be abutted against the connector and a second end opposite thereto, and abutting the second end of the spring against a first shoulder surface defined in the block.

16. The method of claim 15 further comprising the step of removing an insert set in the block to create additional space where the removed connector pair had been disposed.

* * * * *